US006898822B2

(12) United States Patent
Nordquist et al.

(10) Patent No.: US 6,898,822 B2
(45) Date of Patent: May 31, 2005

(54) PRESS-FIT FEED-THROUGH DEVICE

(76) Inventors: Thaddeus E. Nordquist, 3099 Jodi La., Palm Harbor, FL (US) 34684; Eric Lawrence Nordquist, 809 Normandy Rd., Clearwater, FL (US) 33760; Kevin T. Luce, 14878 55$^{th}$ Way North, Clearwater, FL (US) 33760

( * ) Notice: Subject to any disclaimer, the term of this patent is extended or adjusted under 35 U.S.C. 154(b) by 114 days.

(21) Appl. No.: 10/393,162

(22) Filed: Mar. 20, 2003

(65) Prior Publication Data

US 2004/0185718 A1 Sep. 23, 2004

(51) Int. Cl.[7] .............................. F16L 5/00; H02G 3/22

(52) U.S. Cl. .............................................. 16/2.1; 16/2.2

(58) Field of Search ............................ 16/2.1, 2.2, 2.3, 16/2.4, 108, 109; 285/151.1, 149.1; 361/302; 174/65 G, 152 G, 152 R, 153 G, 152 E, 35 R, 35 C, 35 GC

(56) References Cited

U.S. PATENT DOCUMENTS

| | | | | |
|---|---|---|---|---|
| 3,855,413 A | * | 12/1974 | Baillie | 174/48 |
| 3,983,598 A | * | 10/1976 | Rosan et al. | 16/2.4 |
| 4,234,218 A | * | 11/1980 | Rogers | 285/149.1 |
| 4,752,652 A | * | 6/1988 | Danti et al. | 174/83 |
| 4,922,573 A | * | 5/1990 | Miller et al. | 16/2.1 |
| 5,455,986 A | * | 10/1995 | Gentile | 16/2.2 |
| 5,627,343 A | * | 5/1997 | Brandolf | 174/153 R |
| 5,737,800 A | * | 4/1998 | Lesage | 277/314 |
| 6,275,369 B1 | * | 8/2001 | Stevenson et al. | 361/302 |
| 6,444,907 B1 | * | 9/2002 | Kiely | 174/65 R |
| 6,453,551 B1 | | 9/2002 | Nordquist et al. | |
| 6,495,755 B2 | * | 12/2002 | Burton et al. | 174/65 G |

FOREIGN PATENT DOCUMENTS

| | | | | |
|---|---|---|---|---|
| DE | 4109206 C1 | * | 5/1992 | |
| DE | 4200866 A1 | * | 7/1993 | E04F/17/08 |
| EP | 0122784 A1 | * | 10/1984 | |
| EP | 0774815 A2 | * | 5/1997 | |
| EP | 1043823 A2 | * | 10/2000 | H02G/3/22 |

OTHER PUBLICATIONS

Pem Bulletin—Threaded Inserts for Plastics.

* cited by examiner

*Primary Examiner*—Chuck Y. Mah
(74) *Attorney, Agent, or Firm*—Mark A. Navarre

(57) ABSTRACT

A press-fit feed-through device has one or more sets of laterally protruding and symmetrically distributed teeth that are laterally aligned and cut through the material of a bulkhead as the feed-through is inserted into a bulkhead opening. Lateral grooves disposed immediately inboard of each set of teeth receive the bulkhead material cut by the respective set of teeth. In feed-through devices having more than one set of teeth, the additional sets of teeth are located successively outboard of, and in axial alignment with, the first set of teeth, and cut successively deeper into the bulkhead as the feed-through is inserted into the opening.

14 Claims, 2 Drawing Sheets

FIG. 3
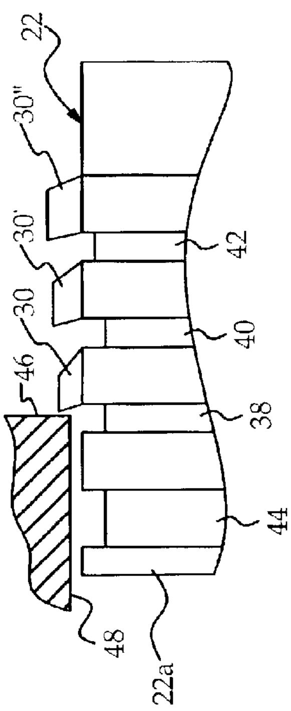
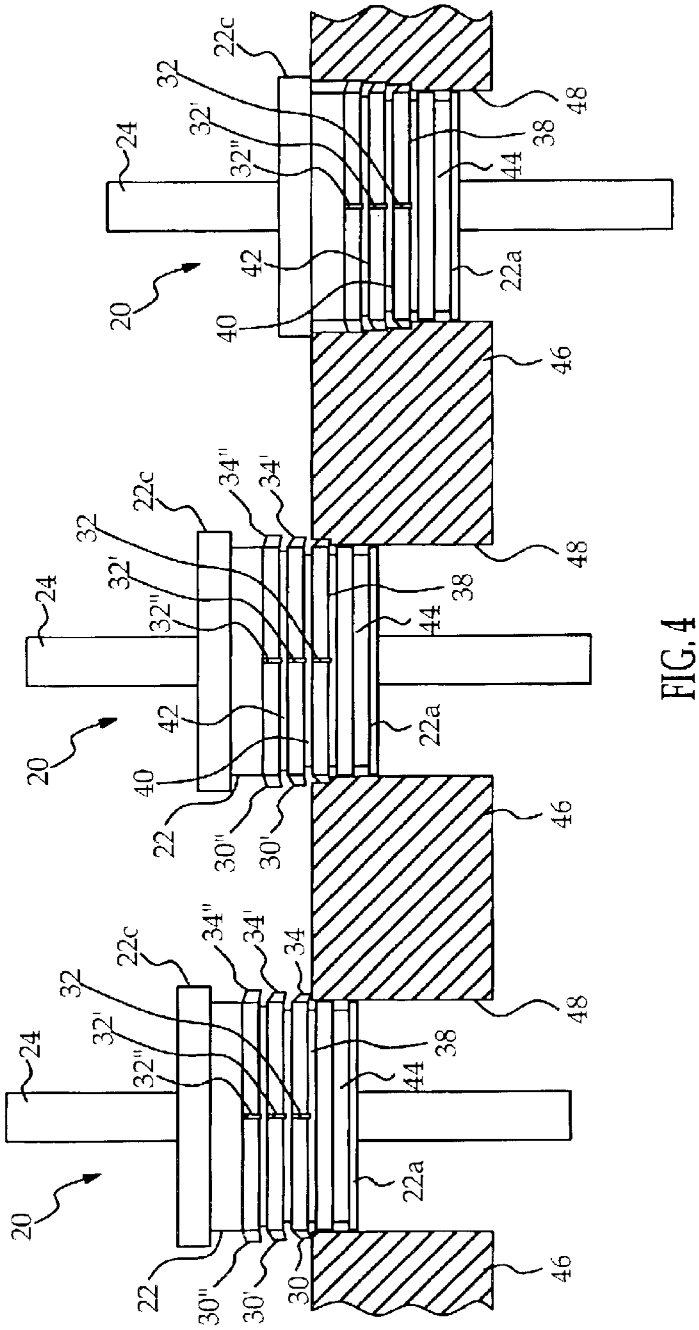
FIG. 4

PRESS-FIT FEED-THROUGH DEVICE

TECHNICAL FIELD

This invention relates to a feed-through device for communicating through a bulkhead, and more particularly, to a press-fit feed-through device.

BACKGROUND OF THE INVENTION

A feed-through (or feed-thru) is a device used to enable communication of some sort through a bulkhead, such as a housing of an electronic module. Any feed-through has a body portion adapted to be secured in an opening formed in the bulkhead, and the body portion is provided with one or more through-holes that define communication paths through the bulkhead. The communication may be physical (pneumatic, liquid, gaseous or mechanical, for example), optical or electrical. In electrical applications, for example, each through-hole accommodates an electrical wire, and the space between each wire and the inside diameter of the respective through-hole is filled with a non-conductive sealant to electrically insulate the wire from the body portion and to provide an environmental seal. If a hermetic seal is required, the sealant may be a glass or ceramic composition, such as shown in the U.S. Pat. No. 5,650,759 to Hittman et al., issued on Jul. 22, 1997. In other applications, an epoxy or thermosetting plastic material may be used as a sealant, such as shown and described in the U.S. Pat. No. 6,453,551 to Nordquist et al. Many electrical feed-throughs also include a filter component such as a ceramic capacitor which is soldered to the wire and the body portion to provide electrical noise suppression in signals carried by the wire. Other filter elements such as inductors and/or resistors may also be incorporated into the body portion to form various well-known filter topologies.

While soldering or threading has traditionally been used to secure feed-through devices in the bulkhead opening, press-in feed-through devices have gained popularity, particularly in electrical applications where the bulkhead material is typically a relatively soft metal such as aluminum or zinc. FIGS. 1A and 1B depict a representative prior art press-in electrical feed-through device 10 having a cylindrical body portion 12 formed of a material significantly harder than the typical bulkhead material. An electrical wire 14 passes through a through-hole 16 formed in the body 12, and a sealant 18 fills the space in through-hole 16 around the wire 14. The body portion 12 includes an inboard end 12*a* that centers the feed-through 10 in the bulkhead opening, a circumferentially knurled portion 12*b* providing an interference fit between the feed-through 10 and the bulkhead opening, and a flange 12*c* for limiting the depth of insertion. When the feed-through 10 is pressed into the bulkhead opening, the knurls 12*b* gall or plow into the bulkhead material, and insertion forces on the order of several hundred pounds are commonly required. This not only gouges and work-hardens the bulkhead material, but also exerts very high radially compressive forces on the periphery of the body portion 12. The compressive forces are of particular concern because they tend to flex the body portion 12, and can crack solder joints and ceramic sealants and components of the feed-through 10. In cases where such a failure occurs, the defective feed-through 10 can be removed, but it is difficult to securely seat a replacement feed-through device in the same bulkhead opening due to the prior gouging and work-hardening of the surrounding bulkhead material. Accordingly, what is needed is an improved press-fit feed-through device that can be inserted with lower force, and that is less susceptible to failure due to compressive loading during insertion.

SUMMARY OF THE INVENTION

The present invention is directed to an improved feed-through device designed to be press-fit into a bulkhead opening, featuring low insertion force, minimal disturbance of the bulkhead material surrounding the opening, and low radially compressive forces. The periphery of the feed-through body portion includes one or more sets of laterally protruding and symmetrically distributed teeth that are laterally aligned and cut through the bulkhead material as the feed-through is inserted into the bulkhead opening, and preferably includes lateral grooves disposed immediately inboard of each set of teeth receive the bulkhead material cut by the respective set of teeth. In embodiments having more than one set of teeth, the additional sets of teeth are located successively outboard of, and in axial alignment with, the first set of teeth, and cut successively deeper into the bulkhead as the feed-through is inserted into the opening.

The bulkhead material is only disturbed in the vicinity of the axially-aligned teeth, and the material is cut instead of gouged and work-hardened so that the radially compressive force is reduced to near zero. Additionally, the reduced area of the teeth (as compared with peripheral knurling), the incremental cutting action of the axially-aligned teeth, and the capture of cut bulkhead material in the respective lateral grooves contribute to significantly reduced insertion force.

BRIEF DESCRIPTION OF THE DRAWINGS

FIGS. 1A and 1B respectively depict end and side views of a prior art press-fit feed-through.

FIG. 3 is an enlarged view of a portion of the feed-through depicted in FIG. 2B.

FIG. 4 depicts successive stages of insertion of the feed-through of FIGS. 2A–2B in a bulkhead opening.

DESCRIPTION OF THE PREFERRED EMBODIMENT

The press-fit feed-through device of the present invention is disclosed herein in the context of a cylindrical electrical feed-through having a single through-hole supporting a single electrical wire for feed-through electrical communications. However, the invention is equally applicable to feed-through devices that are non-cylindrical (rectangular, for example), to feed-through devices designed for physical or optical communications, or to feed-through devices having two or more through-holes for multiple communication channels.

Figure 1A:
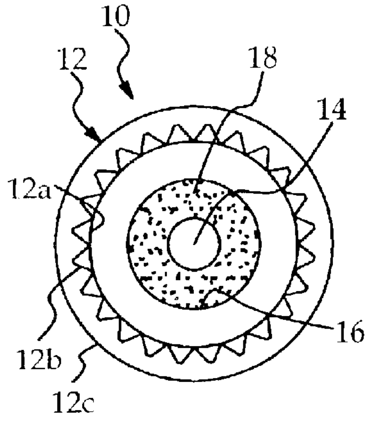
PRIOR ART FIG. 1A
Figure 1B:
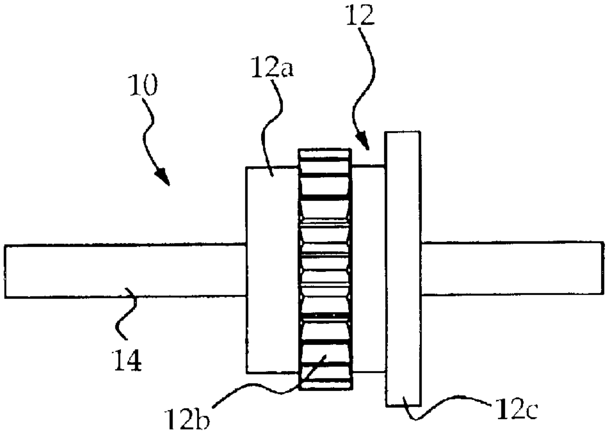
PRIOR ART FIG. 1B
Figure 2A:
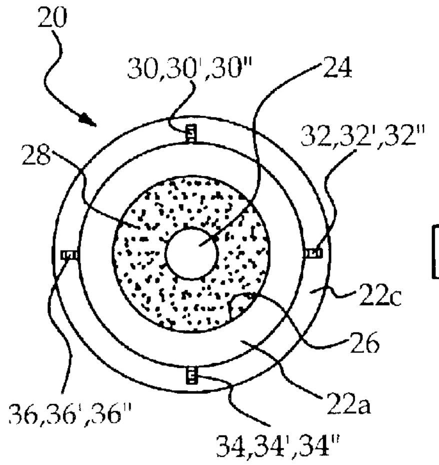
FIGS. 2A and 2B respectively depict end and side views of a press-fit feed-through according to this invention.
Figure 2B:
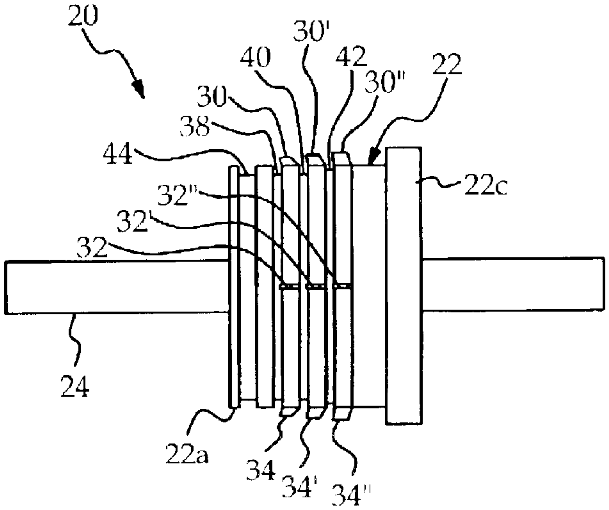

Referring to FIGS. 2A–2B, the reference numeral 20 generally designates the press-fit feed-through device of the present invention. As with the prior art feed-through 10 of FIGS. 1A–1B, the feed-through 20 comprises a cylindrical body portion 22 and an axial through-hole 26. A solid electrical wire 24 extends through the through-hole 26, and a sealant 28 fills the space in through-hole 26 around the wire 24. As indicated above, the sealant 28 may be a glass or ceramic composition, or an epoxy or thermosetting plastic material, depending on the application and the environmental sealing requirements. As also mentioned above, the feed-through device 20 may include one or more filter elements such as a ceramic capacitor for electrically filtering signals carried by the wire 24; such filter elements are typically housed in a suitable cavity (not shown) formed in the outboard end of body portion 22.

As with the prior art feed-through 10, the body portion 22 of feed-through device 20 has an inboard end 22*a* that centers the feed-through 20 in the bulkhead opening, and a flange 22*c* for limiting the depth of insertion. However, instead of a circumferentially knurled portion 12*b*, the feed-through of the present invention features one or more sets of laterally protruding, laterally aligned, and symmetrically distributed teeth that cut through the bulkhead material as the feed-through is inserted into the bulkhead opening, and lateral grooves disposed immediately inboard of each set of teeth receive the bulkhead material cut by the respective set of teeth. In mechanizations having more than one set of teeth, the additional sets of teeth are located successively outboard of, and in axial alignment with, the first set of teeth, and cut successively deeper into the bulkhead as the feed-through 20 is inserted into the opening.

The feed-through 20 depicted in FIGS. 2A–2B features three sets of teeth, each set having four teeth symmetrically distributed about the lateral periphery of the body 22. Referring to FIGS. 2A–2B and the enlarged view of FIG. 3, the first set is defined by the laterally aligned teeth 30, 32, 34, 36, the second set is defined by the laterally aligned teeth 30', 32', 34', 36', and the third set is defined by the laterally aligned teeth 30", 32", 34", 36". The teeth 30, 30' and 30" are aligned parallel to an axis of insertion of the feed-through 20, and the teeth 30' and 30" successively protrude from the body 22 to a greater extent than the tooth 30. The same relationship is true, of course, for the teeth 32, 32' and 32", the teeth 34, 34' and 34", and the teeth 36, 36' and 36". A first groove 38 is disposed immediately inboard or forward of the first set of laterally aligned teeth 30, 32, 34, 36; a second groove 40 is disposed immediately inboard or forward of the second set of laterally aligned teeth 30', 32', 34', 36'; and a third groove 42 is disposed immediately inboard or forward of the third set of laterally aligned teeth 30", 32", 34", 36". The feed-through 20 also includes a fourth groove 44 disposed near the inboard end of the body portion 22 for capturing a wicking sealant applied to the exterior periphery of the bulkhead 46 for environmental scaling purposes; the fourth groove 44 may also serve to capture small pieces of the bulkhead sidewall material that are severed by the teeth during insertion of the feed-through 20.

FIG. 4 depicts progressive views of the feed-through 20 as it is inserted into an opening 48 of bulkhead 46. It will be seen that as the feed-through 20 is pressed into the opening 48, the various teeth cut or slice into the material of bulkhead 46 adjacent the opening 48, and such material collapses into the groove 38, 40, 42 immediately inboard of the respective teeth. Thus, the bulkhead material cut by the first set of teeth 30, 32, 34, 36 collapses into the groove 38; the bulkhead material cut by the second set of teeth 30', 32', 34', 36' collapses into the second groove 40; and the bulkhead material cut by the third set of teeth 30", 32", 34", 36" collapses into the third groove 42. Analysis has shown that the bulkhead material retained in the grooves 38, 40, 42 tends to remain in continuity with the rest of the bulkhead 46, effectively locking the feed-through 20 in place in the bulkhead opening 48 despite the relatively small area of contact between the teeth and the bulkhead 46. It will also be seen that the successive sets of teeth progressively cut deeper into the bulkhead material as the feed-through 20 is inserted in the opening 48, contributing to a relatively low overall insertion force that is initially very low and builds as the various sets of teeth contact the bulkhead 46.

The progressively increasing lateral protrusion of the axially aligned teeth also makes the feed-through 20 more tolerant to variation in the size of the bulkhead opening 48. In cases where the opening 48 is smaller than specified, the depth of cut is simply increased; in cases where the opening 48 is larger than specified, the interference fit is usually sufficient to obtain an adequate hold in the opening 48. The latter situation is particularly advantageous in applications where the through-hole 20 is to be soldered in place, and the opening is oversized for optimal soldering; in such an application, the teeth of feed-through 20 achieve a temporary hold in the opening prior to soldering, eliminating the use of adhesives ordinarily used for such purpose.

In summary, the feed-through device of the present invention is much less susceptible to failure during insertion, compared with prior art press-fit feed-through devices. The bulkhead material is only disturbed in the vicinity of the axially-aligned teeth, and the material is cut instead of gouged and work-hardened so that the radially compressive force is reduced to near zero. Additionally, the reduced area of the teeth (as compared with peripheral knurling), the incremental cutting action of the projections, and the capture of cut bulkhead material in the respective lateral grooves contribute to significantly reduced insertion force. In fact, the insertion force is sufficiently low that the feed-through devices 20 may be installed manually with an impact tool, as opposed to conventional press-fit devices which require a machine press for insertion. While described in reference to the illustrated embodiment, it is expected that various modifications in addition to those mentioned above will occur to those skilled in the art. For example, the number of sets of teeth and the number of teeth per set may be greater or lesser than shown, and so on. Accordingly, it will be understood that feed-through devices incorporating these and other modifications may fall within the scope of this invention, which is defined by the appended claims.

What is claimed is:

1. A feed-through device having a body portion that forms an interference fit with a bulkhead when axially inserted into an opening in said bulkhead, comprising:

a first set of laterally aligned teeth protruding laterally from a periphery of said body portion and shaped to cut into said bulkhead as said body portion is axially inserted into said opening, said first set of teeth being symmetrically distributed about a lateral perimeter of said body portion; and a first lateral groove in said periphery of said body portion immediately inboard of said first set of teeth for receiving portions of said bulkhead cut by said first set of teeth.

2. The feed-through device of claim 1, further comprising:

a second set of laterally aligned teeth protruding laterally from said periphery of said body portion and shaped to cut into said bulkhead as said body portion is axially inserted into said opening, said second set of teeth being disposed outboard of said first set of teeth and axially aligned with said first set of teeth so that said second set of teeth cut into said bulkhead in line with and subsequent to said first set of teeth; and a second lateral groove in said periphery of said body portion immediately inboard of said second set of teeth for receiving portions of said bulkhead cut by said second set of teeth.

3. The feed-through device of claim 2, further comprising:

a third set of laterally aligned teeth protruding laterally from said periphery of said body portion and shaped to cut into said bulkhead as said body portion is axially inserted into said opening, said third set of teeth being disposed outboard of said second set of teeth and axially aligned with said first and second sets of teeth so that said third set of teeth cut into said bulkhead in line with and subsequent to said first and second sets of teeth; and a third lateral groove in said periphery of said body portion immediately inboard of said third set of teeth for receiving portions of said bulkhead cut by said third set of teeth.

4. The feed-through device of claim 3, wherein said third set of teeth protrude laterally from said periphery of said body portion to a greater extent than said first and second sets of teeth.

5. The feed-through device of claim 1, further comprising:

a sealing lateral groove in said periphery of said body portion inboard of said first lateral groove for receiving a wicking sealant applied to said bulkhead after insertion of said feed-through device into said bulkhead.

6. The feed-through device of claim 2, wherein said second set of teeth protrude laterally from said periphery of said body portion to a greater extent than said first set of teeth.

7. The feed-through device of claim 1, wherein said laterally aligned teeth occupy only a minor part of said body portion about said lateral perimeter, and the remaining part of said body portion about said lateral perimeter does not interfere with said bulkhead.

8. A press-fit feed-through device, comprising:

a body portion;

a first set of laterally aligned teeth protruding laterally from said body portion and shaped for cutting, said first set of teeth being symmetrically distributed about a lateral perimeter of said body portion; and a first lateral groove in a periphery of said body portion immediately inboard of said first set of teeth.

9. The press-fit feed-through device of claim 8, wherein said laterally aligned teeth occupy only a minor portion of said lateral perimeter.

10. The press-fit feed-through device of claim 8, further comprising:

a second set of laterally aligned teeth protruding laterally from said body portion and shaped for cutting, said second set of teeth being disposed outboard of said first set of teeth and axially aligned with said first set of teeth; and a second lateral groove in said periphery of said body portion immediately inboard of said second set of teeth.

11. The press-fit feed-through device of claim 10, wherein said second set of teeth protrude laterally from said periphery of said body portion to a greater extent than said first set of teeth.

12. The press-fit feed-through device of claim 10, further comprising:

a third set of laterally aligned teeth protruding laterally from said periphery of said body portion and shaped for cutting, said third set of teeth being disposed outboard of said second set of teeth and axially aligned with said first and second sets of teeth; and a third lateral groove in said periphery of said body portion immediately inboard of said third set of teeth.

13. The feed-through device of claim 12, wherein said third set of teeth protrude laterally from said periphery of said body portion to a greater extent than said first and second sets of teeth.

14. The feed-through device of claim 8, further comprising:

a sealing lateral groove in said periphery of said body portion inboard of said first lateral groove.

* * * * *